(12) United States Patent
Khongbantabam et al.

(10) Patent No.: US 9,151,060 B2
(45) Date of Patent: Oct. 6, 2015

(54) CONSTRUCTION BLOCK

(71) Applicant: STRAMOS OY, Helsinki (FI)

(72) Inventors: Nabakumar Singh Khongbantabam, Espoo (FI); Aki Lempinen, Helsinki (FI); Janne Manninen, Espoo (FI); Soroush Moradi, Espoo (FI); Ville Nenonen, Helsinki (FI)

(73) Assignee: STRAMOS OY, Helsinki (FI)

( * ) Notice: Subject to any disclaimer, the term of this patent is extended or adjusted under 35 U.S.C. 154(b) by 64 days.

(21) Appl. No.: 14/059,631

(22) Filed: Oct. 22, 2013

(65) Prior Publication Data

US 2015/0107177 A1    Apr. 23, 2015

(51) Int. Cl.
*E04F 13/00* (2006.01)
*E04F 13/076* (2006.01)
*E04F 13/08* (2006.01)
*F16B 7/04* (2006.01)
*F16B 12/20* (2006.01)

(52) U.S. Cl.
CPC .......... *E04F 13/076* (2013.01); *E04F 13/0862* (2013.01); *E04F 13/0871* (2013.01); *E04F 13/0892* (2013.01); *E04F 13/0894* (2013.01); *E04F 2201/0107* (2013.01); *E04F 2201/022* (2013.01); *E04F 2201/0547* (2013.01); *E04F 2201/098* (2013.01); *F16B 7/046* (2013.01); *F16B 7/0473* (2013.01); *F16B 12/2027* (2013.01)

(58) Field of Classification Search
CPC .. F16B 7/046; F16B 12/2027; F16B 12/2009; F16B 7/0473; Y10S 403/12; Y10S 403/08; E04F 13/076; E04F 13/0871; E04F 13/0892; E04F 2201/098; E04F 2201/0547; E04F 2201/0107

USPC ......... 52/311.2; 403/348, 321, 322.1, DIG. 4, 403/DIG. 10
See application file for complete search history.

(56) References Cited

U.S. PATENT DOCUMENTS

| | | | | |
|---|---|---|---|---|
| 4,439,971 | A * | 4/1984 | Rutherford | 312/263 |
| 4,455,103 | A * | 6/1984 | Hackenberg | 403/190 |
| 4,572,694 | A * | 2/1986 | Hoeksema | 403/187 |
| 4,693,630 | A * | 9/1987 | Giovannetti | 403/231 |
| 5,810,505 | A * | 9/1998 | Henriott et al. | 403/230 |
| 6,065,854 | A | 5/2000 | West et al. | |
| 6,142,700 | A * | 11/2000 | Grieser et al. | 403/286 |
| 6,148,569 | A * | 11/2000 | Giovannetti | 52/127.11 |
| 6,299,397 | B1 * | 10/2001 | Mengel | 411/24 |

(Continued)

FOREIGN PATENT DOCUMENTS

EP    00421122    4/1991
EP    2042983    4/2009

*Primary Examiner* — Basil Katcheves
*Assistant Examiner* — Joshua Ihezie
(74) *Attorney, Agent, or Firm* — Young & Thompson (57) ABSTRACT

A construction block 1, which can be used to build ornamental structures, wall boards, decorative coatings etc., includes a front face 2, a back face 3 and edges 4. Each edge has a projection 5 and a recess 6. The projection includes a claw 7 on both sides of the projection 5, and the recess includes a notch 8 on both sides of the recess 6. The projection matches with the recess in order to connect the construction block 1 to a similar construction block. The construction block includes also a wheel 9 that has wedges 11 for each edge 4 of the construction block. The wedge 11 locks the connection between the construction block 1 and the similar construction lock when turning the wheel 9.

17 Claims, 6 Drawing Sheets

(56) References Cited

U.S. PATENT DOCUMENTS

| | | |
|---|---|---|
| 6,334,732 B1 * | 1/2002 | Strassle et al. .................. 403/321 |
| 6,547,477 B1 * | 4/2003 | Huber et al. ................. 403/322.4 |
| 6,688,371 B2 * | 2/2004 | Rutan et al. .................... 160/135 |
| 6,813,853 B1 | 11/2004 | Tucker |
| 6,908,252 B1 * | 6/2005 | Rubano ........................... 403/231 |
| 2002/0023391 A1 * | 2/2002 | Nymark ............................ 52/36.4 |
| 2008/0024387 A1 | 1/2008 | Maskeny et al. |
| 2012/0027967 A1 * | 2/2012 | Maertens et al. ............. 428/34.1 |
| 2013/0121760 A1 * | 5/2013 | Chen et al. ..................... 403/362 |

\* cited by examiner

CONSTRUCTION BLOCK

FIELD OF TECHNOLOGY

The present invention relates to a construction block that can be used to build ornamental structures, wall boards, decorative coatings, tile figures, advertising signs etc.

PRIOR ART

It is known to use different wall panels, ceiling panels and floor panels for coating interior rooms. Usually they have a male connector on one edge of the panel and a female connector on another edge of the panel. The male and female connectors are put against each other to build, for example a floor coating. In many solutions the connectors snap in against each other quite tightly. However if needed the removing of the connection is not so easy because the connectors may break. The coatings also require a separate support structure. Furthermore, the panels are designed for a certain purpose only, like to floors or walls.

In addition there exist different constructions for advertising signs and signboards. There also exist different displays used in stands, department stores and so on for advertising, showing products etc. They have a support structure wherein a display arrangement has been installed. These support structures are also designed only for specific displays, and they are not easy to build and disassemble.

So the prior art solutions have been designed for certain implementation conditions, and they are not easy to disassemble.

SHORT DESCRIPTION OF INVENTION

The aim of the invention is to provide a construction block that can be used for many purposes being easy to assemble and to disassemble. The aim is achieved by a way described in the independent claim. Dependent claims illustrate different embodiment of the invention.

An inventive construction block comprises a front face, a back face and edges. Each edge has a projection and a recess. The projection comprises a claw on both sides of the projection, and the recess comprises a notch on both sides of the recess. The projection matches with the recess in order to connect the construction block to a similar construction block such that the claws are arranged to put in the notches.

The construction block comprises also a wheel that can be turned, for example, from the back face. The wheel has wedges for each edge of the construction block on a circumferential edge of the wheel. Each wedge is arranged to push the claws against the notches and to lock a connection between the construction block and the similar construction lock when turning the wheel.

LIST OF FIGURES

In the following, the invention is described in more detail by reference to the enclosed drawings, where.

DESCRIPTION OF THE INVENTION

Figure 1:
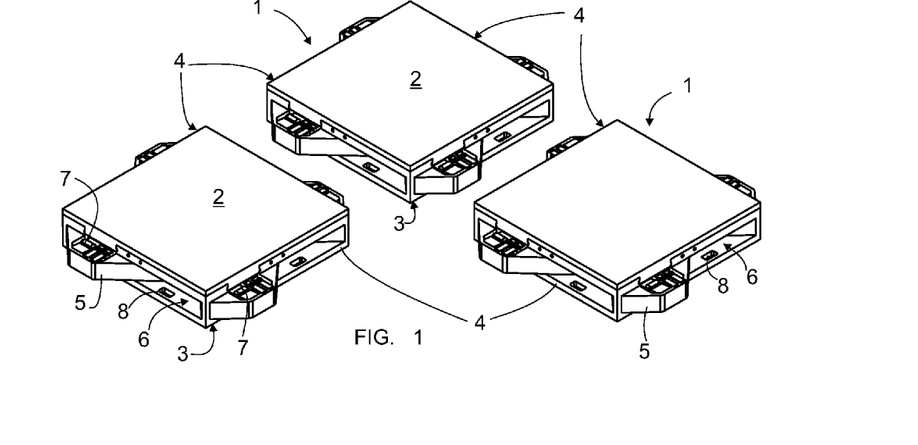
FIG. 1 illustrates an example of construction blocks according to the invention viewed from the front.

FIG. 1 illustrates an example of construction blocks according to the invention. The construction block 1 comprises a front face 2, a back face 3 and edges 4. Each edge has a projection 5 and a recess 6. The block has at least three edges. The block having four edges provides a practical embodiment, and also the block with five edges is quite practical. The projection 5 comprises a claw 7 on both sides of the projection, and the recess 6 comprises a notch 8 on both sides of the recess. The projection matches with the recess in order to connect the construction block 1 to a similar construction block such that the claws 7 are arranged to put in the notches 8.

Figure 2:
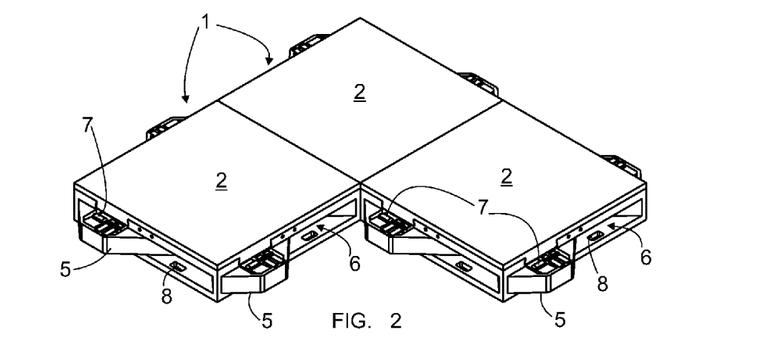
FIG. 2 illustrates the example of FIG. 1 when the blocks have been connected to each other.
Figure 3:
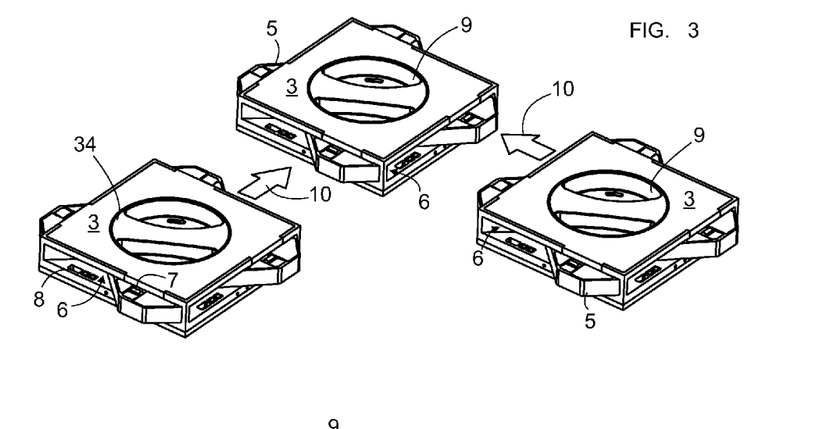
FIG. 3 illustrates an example of construction blocks according to the invention viewed from the back.

FIG. 2 shows how the blocks are connected with each other. The claws 7 and notches 8 provide snap-in connections between the construction blocks. The snap in connections as such are not very firm and therefore any larger constructions cannot be built using only snap-in connections. If the snap-in connections were tight and firm, they would be difficult to connect and disconnect. Therefore the construction block 1 comprises also a wheel 9 that can be turned. FIG. 3 shows three construction blocks from the back. Arrows 10 illustrate how the blocks are connected, i.e. the projections 5 are pushed into the recesses 6.

Figure 4:
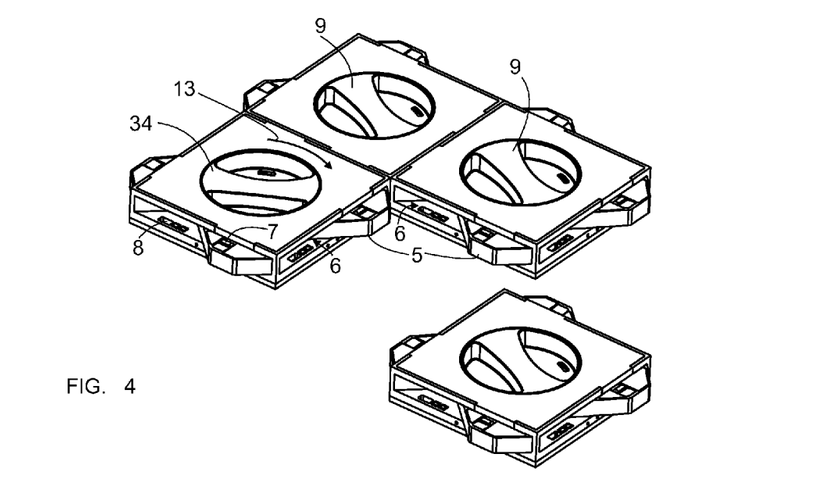
FIG. 4 illustrates the example of FIG. 3 when the blocks have been connected to each other and how to lock the connections.
Figure 10:
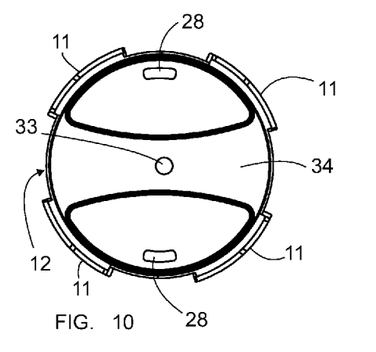
FIG. 10 illustrates an example of a wheel part of the construction block.
Figure 11:
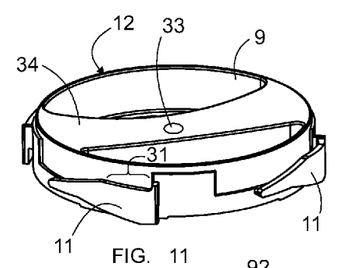
FIG. 11 illustrates the example of FIG. 10 from another view.
Figure 12:
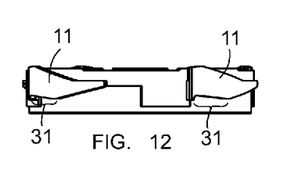
FIG. 12 illustrates the example of FIG. 10 from yet another view.

The wheel 9 has wedges 11 for each edge 4 of the construction block on a circumferential edge 12 of the wheel (See FIGS. 10-12). Each wedge is arranged to push the claws 7 against the notches 8 and to lock a connection between the construction block and the similar construction lock when turning the wheel 9. Arrow 13 in FIG. 4 illustrates turning of the wheel 9 from an unlocked position to a locked position. So the wheel with its wedge locks and tightens up the connections between the blocks. When turning the wheel vice versa to arrow 13 in FIG. 4 the connections are unlocked and a group of the blocks can be disassembled. As can be seen in FIGS. 3 and 4 the wheel can comprise a grip 34 for turning the wheel. The grip may also have another means for turning the wheel like a groove that matches with a hand tool.

The wheel 9 is turned from the back face 3 in the embodiment of the figures. However the construction block can be made in such a way that the wheel can be turned via the front side 2 that is covered by a coating plate after the rotation of the wheel.

Figures 5, 6:
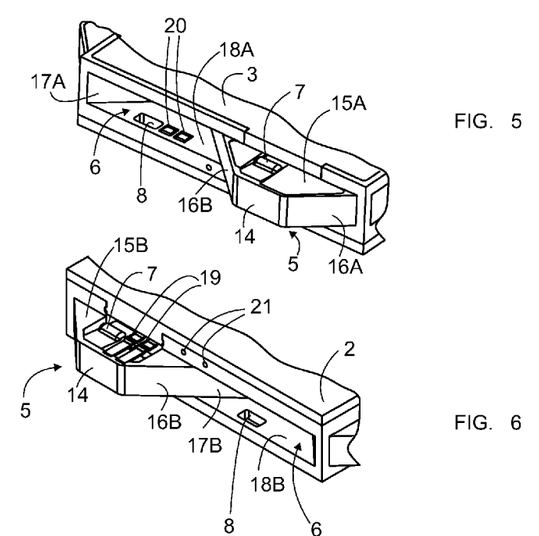
FIG. 5 illustrates an example of the connectors of the construction block according the invention.
FIG. 6 illustrates the example of FIG. 5 from the other side.

FIGS. 5 and 6 show the projection 5 and recess 6 in more detail. In this embodiment the projection and recess have been designed to have a wedge like shape. The projection narrows from the edge 4 of the construction block 1 to the tip 14 of the projection 5, and the recess 6 narrows from the edge 4 of construction block to the bottom of the recess. The wedge like shape helps to put the projection into the recess since the slope edges direct the projection into correct position. However the shape of the projection and recess can be another, for example rectangular.

The sides 15A, 15B, 18A, 18B and edges 16A, 16B, 17A, 17B of the projection and recess match in order to put the projection into the recess. The matching projection and recess provide also a support for the connection between the blocks. As can be seen in this embodiment the other edge 16B of the projection continues as the other edge 17B of the recess. It can be noted that the embodiments of this description comprises one projection and one recess on each edge 4 of the block 1. However it is possible to form a block having more projections and recesses as well.

If the construction block is used as a display module, the recess 6 and projection 5 may have electrical connectors 19, 20 for connecting the blocks electrically. In addition the edge 4 of the block 1 may have connectors 21 for datacommunication.

Figure 7:
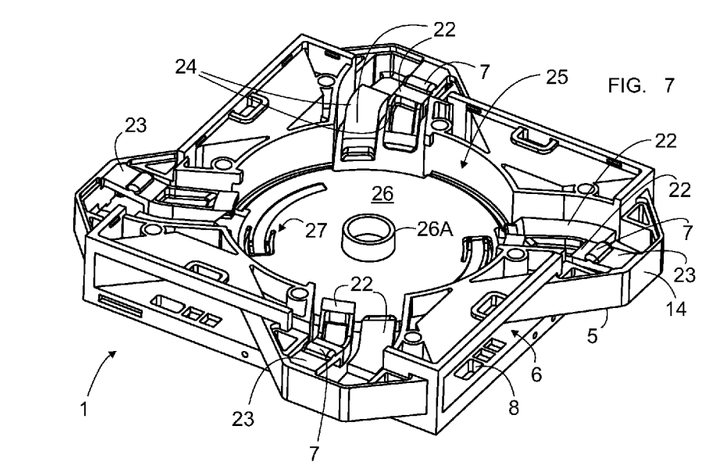
FIG. 7 illustrates an example of parts of the construction block according to the invention.

FIG. 7 illustrates the claws 7 in more detail. In this embodiment the claw is provided with an arm 22 that is towards the wheel (not showed in FIG. 7). The arms 22 of the claws of each projection 5 can be pushed away from each other by the wedge 11 of the wheel 9 when turning the wheel for locking the connection. The wedge 11 is between the arms 22 in the locking position of the wheel. This claw embodiment is also provided with a resilient arm 23 that connects the claw 7 to the projection 5. Further, each arm towards the wheel comprises a bend 24 in order to direct the arm 22 to be perpendicular to the edge 12 of the wheel.

The construction block 1 has a space 25 to the wheel 9. The space has a bottom 26 that comprises a lip 27. In the middle of the bottom there can be a central projection 26A whose height can be designed to a desired level. The wheel has a hole 28 in which the lip is arranged to set when the wheel 9 is turned to the locking position. The combination of the lip 27 and the hole 28 indicates the locking position to a user and provides an obstacle against free turning of the wheel at the locking position.

Figure 8:
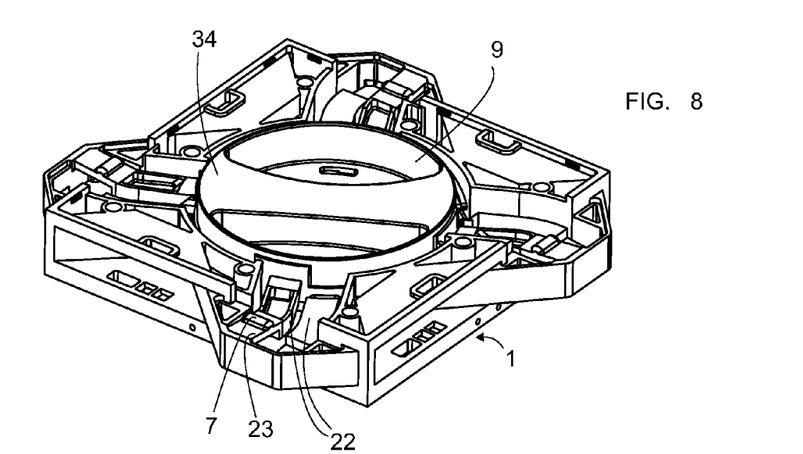
FIG. 8 illustrates an example of the construction block in an unlocked state
Figure 9:
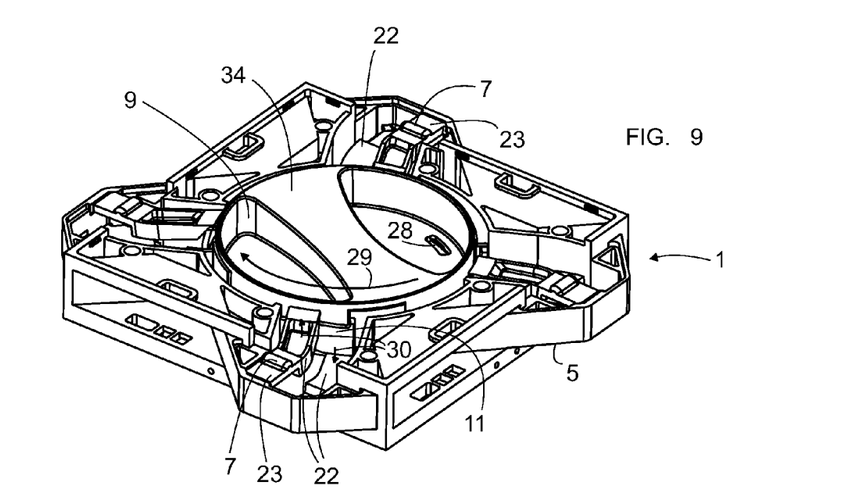
FIG. 9 illustrates the example of FIG. 9 in a locked state.
Figure 13:
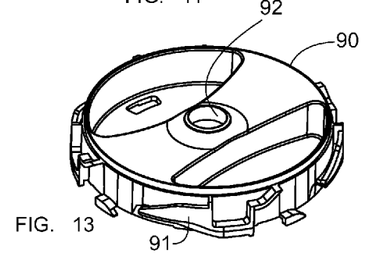
FIG. 13 illustrates another example of a wheel part of the construction block.
Figures 14, 15:
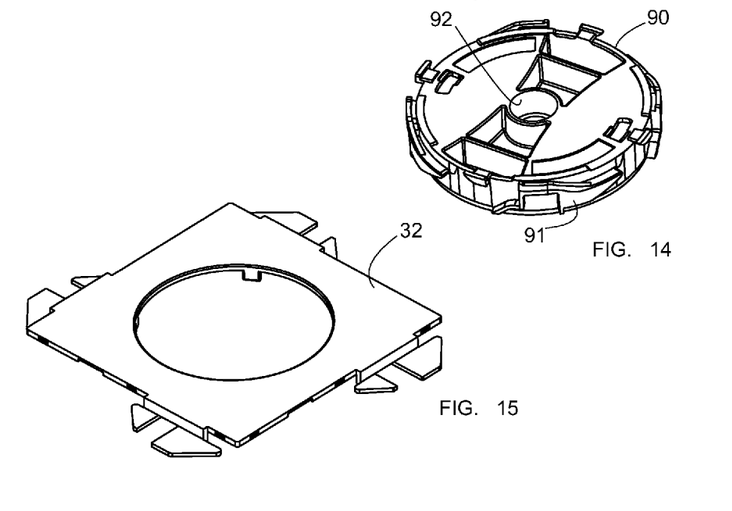
FIG. 14 illustrates the example of FIG. 13 from another view.
FIG. 15 illustrates an example of a back cover for the construction block.

FIG. 8 shows the construction block 1 having the wheel in the space 25 at an unlocked position. FIG. 9 shows the construction block wherein the wheel has been turned clockwise 29 to the locking position. In the locking position, the wedge 11 has pushed (small arrows 30) the arms 22 away from each other, and the wedge is between the arms. FIGS. 10-12 show an example of the wheel according to the invention. It can be seen from FIGS. 11-12 that at least another edge of the wedge 11 can comprise a pocket 31 to the arm 22 of the claw. The pocket is for keeping the wheel in the locking position in order that the wheel does not turn freely. FIGS. 13 and 14 show another embodiment 90 of the wheel whose wedges 91 is formed in a different way than in the embodiment of FIGS. 10-12, and having a central hole 92 for the central projection 26A of the construction block. In addition the back front 3 of the construction block 1 may have a lid 32. FIG. 15 shows an example of the lid.

Figure 16:
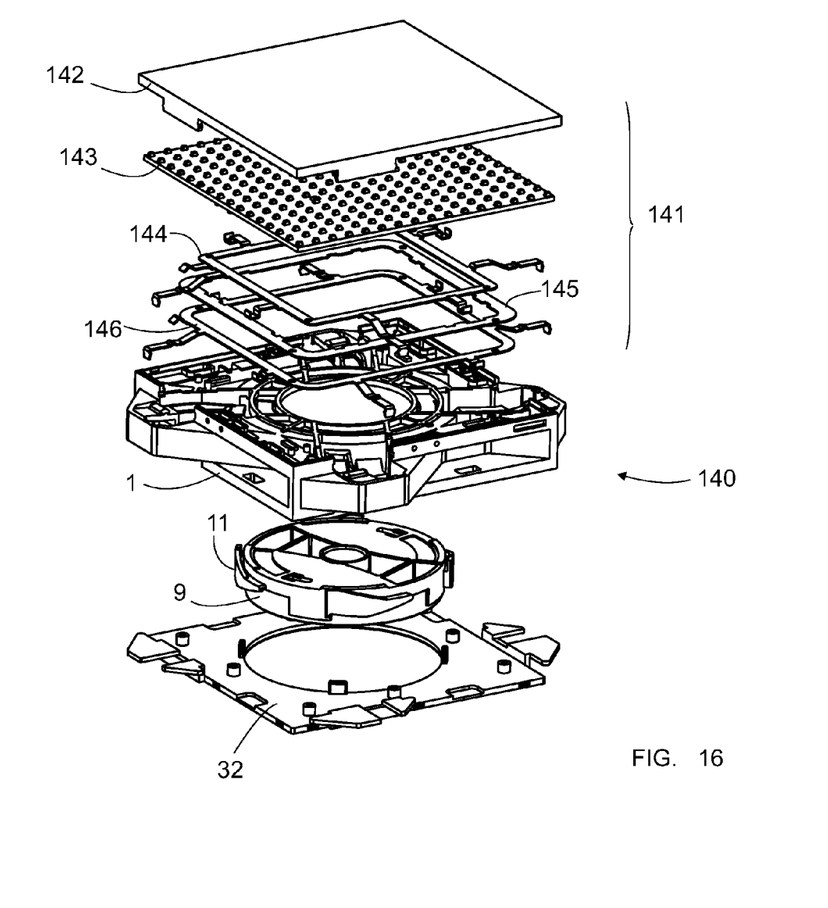
FIG. 16 illustrates an example of a display module that has the construction block according to the invention.

The construction block 1 can be a part of a display module. Several display modules can be assembled together in order to provide a display. As can be seen in FIG. 16 the display module 140 can comprise the construction block 1 and a display arrangement 141. The display arrangement comprises, for example, a front layer 142 having lenses, an electronic matrix board 143, and connectors 144, 146 and insulations 145 that have been installed on the front side of the construction block. The front layer may also be composed of two different layers. So, the front face of the block can comprise a display arrangement.

The front face can also comprise a decoration coating. The coating can be designed to any desired patterns, for example wooden surface, tile surface, different ornamentations etc. Therefore different interior coatings of walls and ceilings can be formed for example. The same construction block can be used to form a large structure since each edge is similar and therefore the edges of the blocks match with each other. Because the connections between the construction blocks are easy to form decorative planes are easy to build. The planes and other structures made of the construction blocks are also easy to disassemble, and the blocks be reused at another place or to build a new decorative configuration.

Because the snap in types connections are also tighten and locked in the invention, it is possible to form large rigid structures like large advertising signs event without separate supports. Therefore the structures made of the inventive blocks can be self-supporting.

The construction block can comprise a screw hole 33 for attaching the block onto a support frame like studs. The screw hole may be situated into the middle of the wheel. The screw can be placed to another spot as well. Other attaching means may also be used like adhesive or a sticker tape.

It is evident from the above that the invention is not limited to the embodiments described in this text but can be implemented in many other different embodiments within the scope of the claims.

The invention claimed is:

1. A construction block, comprising:
   a front face;
   a back face;
   edges, each edge having a recess and a projection, the projection having two sides and a claw on both said sides of the projection, the recess having two sides and a notch on both said sides of the recess, the projection matching with the recess in order to connect the construction block to a similar construction block such that the claws of the construction block mate with notches of the similar construction block; and
   a wheel that is turnable from the back face, the wheel having wedges for each edge of the construction block on a circumferential edge of the wheel, the wedges being directed tangentially to the wheel along the circumferential edge, and each wedge being arranged to push the claws against the notches thereby to lock a connection between the construction block and the similar construction block when the wheel is turned.

2. The construction block according to claim 1, wherein the claw is provided with an arm that is towards the wheel, the arms of the claws of each projection being pushed away from each other by the wedge when the wheel is turned for locking the connection, the wedge being between the arms in locking position of the wheel.

3. The construction block according to claim 2, wherein the claw is provided with a resilient arm that connects the claw to the projection.

4. The construction block according to claim 3, wherein each arm towards the wheel comprises a bend.

5. The construction block according to claim 3, wherein the projection narrows from the edge of the construction block to a tip of the projection, and the recess narrows from the edge of the construction block to a bottom of the recess.

6. The construction block according to claim 1, wherein at least one edge of the wedge comprises a pocket to the arm of the claw.

7. The construction block according to claim 1, wherein the construction block has a space to the wheel, the space having a bottom that comprises a lip, the wheel has a hole in which the lip is arranged to set when the wheel is turned to a locking position of the wheel.

8. The construction block according to claim 1, wherein the wheel comprises a grip for turning the wheel.

9. The construction block according to claim 1, which wherein the front face comprises a decoration coating.

10. The construction block according to claim 1, wherein the front face comprises a display arrangement.

11. The construction block according to claim 1, which wherein the wheel comprises a screw hole.

12. The construction block according to claim 2, wherein the front face comprises a decoration coating.

13. The construction block according to claim 4, wherein the projection narrows from the edge of the construction block to a tip of the projection, and the recess narrows from the edge of the construction block to a bottom of the recess.

14. The construction block according to claim 2, wherein at least one edge of the wedge comprises a pocket to the arm of the claw.

15. The construction block according to claim 2, wherein the construction block has a space to the wheel, the space having a bottom that comprises a lip, and the wheel having a hole in which the lip is arranged to set when the wheel is turned to a locking position of the wheel.

16. The construction block according to claim 2, wherein the wheel comprises a grip for turning the wheel.

17. The construction block according to claim 2, wherein the front face comprises a display arrangement.

* * * * *